(12) United States Patent
Armangau et al.

(10) Patent No.: US 8,972,657 B1
(45) Date of Patent: Mar. 3, 2015

(54) MANAGING ACTIVE—ACTIVE MAPPED LOGICAL VOLUMES

(71) Applicants: Philippe Armangau, Acton, MA (US); Christopher Seibel, Walpole, MA (US); Jean-Pierre Bono, Westborough, MA (US); Dennis Thomas Duprey, Raleigh, NC (US)

(72) Inventors: Philippe Armangau, Acton, MA (US); Christopher Seibel, Walpole, MA (US); Jean-Pierre Bono, Westborough, MA (US); Dennis Thomas Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 222 days.

(21) Appl. No.: 13/629,880

(22) Filed: Sep. 28, 2012

(51) Int. Cl.
*G06F 12/08* (2006.01)
*G06F 3/06* (2006.01)

(52) U.S. Cl.
CPC .............. *G06F 3/067* (2013.01); *G06F 3/0665* (2013.01); *G06F 3/0613* (2013.01); *G06F 3/0689* (2013.01)

USPC .......................................................... 711/114

(58) Field of Classification Search
None
See application file for complete search history.

(56) References Cited

U.S. PATENT DOCUMENTS

| | | | | |
|---|---|---|---|---|
| 8,627,015 | B2 * | 1/2014 | Durocher et al. | 711/141 |
| 2011/0029730 | A1 * | 2/2011 | Durocher et al. | 711/114 |

* cited by examiner

*Primary Examiner* — Kevin Verbrugge
(74) *Attorney, Agent, or Firm* — Deepika Bhayana; Jason A. Reyes; Krishnendu Gupta

(57) ABSTRACT

A method is used in managing active-active mapped logical volumes. A mapped logical volume is created. The mapped logical volume includes first and second mapped logical volumes. Ownership of the first mapped logical volume resides with a first storage processor of a storage system and ownership of the second mapped logical volume resides with a second storage processor of the storage system. The mapped logical volume is managed. An access to the mapped logical volume is provided to the first and second storage processors.

18 Claims, 3 Drawing Sheets

MANAGING ACTIVE—ACTIVE MAPPED LOGICAL VOLUMES

BACKGROUND

1. Technical Field

This application relates to managing active-active mapped logical volumes.

2. Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Disk storage arrays may include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like.

However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a mapped LUN (e.g., thin logical unit (TLU), direct logical unit (DLU)), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

SUMMARY OF THE INVENTION

A method is used in managing active-active mapped logical volumes. A mapped logical volume is created. The mapped logical volume includes first and second mapped logical volumes. Ownership of the first mapped logical volume resides with a first storage processor of a storage system and ownership of the second mapped logical volume resides with a second storage processor of the storage system. The mapped logical volume is managed. An access to the mapped logical volume is provided to the first and second storage processors.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
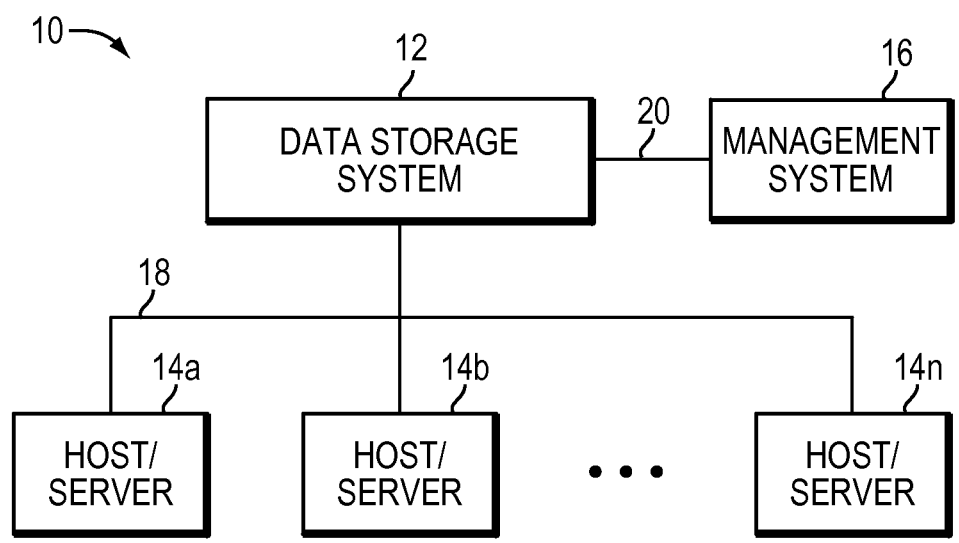
FIG. 1 is an example of an embodiment of a computer system that may utilize the techniques described herein.

Described below is a technique for use in managing active-active mapped logical volumes, which technique may be used to provide, among other things, creating a mapped logical volume, where the mapped logical volume includes first and second mapped logical volumes, where ownership of the first mapped logical volume resides with a first storage processor of a storage system and ownership of the second mapped logical volume resides with a second storage processor of the storage system, and managing the mapped logical volume, where an access to the mapped logical volume is provided to the first and second storage processors.

Generally, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed.

Further, a mapped LUN driver (MLU) presents to a host a virtual volume such as a thinly provisioned LU ("TLU") that is backed by one or more RAID groups in a storage pool. The MLU assigns storage to the virtual volume in slices, for example, 1 GB slices. The slices that make up the virtual volume may come from multiple RAID groups.

Generally, mapped LUNs are managed for use at the application level by paired storage processors (SPs). Ownership of a mapped LUN is determined when the mapped LUN is provisioned by a storage administrator, with one of the storage processors designated as the owner SP and the other SP acting as a backup processing device for the owner SP.

Ownership of a mapped LUN may change under a variety of circumstances. For example, ownership of a mapped LUN may migrate from one SP to another SP for host load balancing reasons, for host failover events, for SP failures, and for manual trespass operations initiated by a storage administrator. The term "trespass," as used herein, refers to a change of ownership of a mapped LUN from one SP to another SP. Host failover is a process by which a storage processor is eliminated as a single point of failure by providing hosts the ability to move the ownership of a mapped LUN from one storage processor to another storage processor.

When a logical volume is managed in an active-passive manner, only one interface to the logical volume is active at a time, and any other interfaces are passive with respect to that logical volume in such a way that the other interfaces may take over if the active interface fails. Thus, for a logical volume managed in the active-passive manner, if there are multiple interfaces to the logical volume, one of the interfaces is designated as the primary route to the logical device.

Conventionally, data storage systems manage a mapped logical volume in the active-passive manner, in which one storage processor that owns the mapped logical volume is regarded as the active storage processor for the mapped logical volume, while the other storage processor is regarded as the passive storage processor for that mapped logical volume, the passive storage processor serving primarily as a backup for the mapped logical volume. Thus, in such a conventional system, the mapped logical volume is accessed by a host system in such a way that the I/O requests sent by the host system can only be executed by a storage processor that owns the mapped logical volume. Further, in such a conventional system, when an I/O request sent from a host to a mapped logical volume through a non-owning SP fails because the SP does not own the mapped LUN, the I/O may be redirected to the owning SP. However, in such a conventional system, redirection of an I/O request from one storage processor to another SP stresses the inter-processor connection, consumes additional system resources and prolongs the response time for the I/O request. As a result, in such a conventional system, overall system performance is degraded.

By contrast, in at least some implementations in accordance with the technique as described herein, the current technique creates a mapped logical volume from two or more mapped logical volumes (e.g., TLUs) in such a way that the mapped logical volume is provided to a host system and managed in the active-active manner. A mapped logical volume which is managed in the active-active manner indicates that all interfaces to the mapped logical volume are active simultaneously. Thus, for a mapped logical volume which is managed in the active-active manner, if there are multiple interfaces to the mapped logical volume, each interface provides equal access to the mapped logical volume. Further, in at least one embodiment of the current technique, based on a portion of a mapped logical volume indicated in an I/O request, the I/O request is sent to a storage processor that owns the portion of the mapped logical volume. Thus, in at least one embodiment of the current technique, a host system determines a set of optimal or near optimal storage processors for sending I/O requests to a mapped logical volume. Further, a mapped logical volume managed in the active-active manner may also be referred to as the active-active mapped logical volume.

Thus, in at least one embodiment of the current technique, if a mapped logical volume is presented to a host system in the active-active manner, I/O requests directed to the mapped logical volume can be sent through any one of the storage processors of a storage system and can be performed with optimal or near optimal performance as no single storage processor owns the entire mapped logical volume thereby increasing connectivity bandwidth to the mapped logical volume. Thus, in such a case, if an I/O request is directed to a portion of an active-active mapped logical volume through a storage processor where the storage processor does not own storage space associated with the portion of the active-active mapped logical volume, the I/O request is redirected to the owning SP. Thus, in at least one embodiment of the current technique, even though half of the I/O requests are directed to non-owning SPs, overall system performance is improved as all SPs can be used to send the I/O requests in such a case.

Thus, in at least one embodiment of the current technique, the active-active manner in which multiple storage processors perform I/O requests simultaneously in order to achieve high throughput indicates that a greater number of requests in a given amount of time may be performed by the multiple storage processors than that performed by only one storage processor operating during that time.

In at least some implementations in accordance with the current technique as described herein, the use of the managing active-active logical volumes technique can provide one or more of the following advantages: improving I/O performance of a host application by eliminating or reducing redirection of I/O requests from one SP to another, improving performance of a mapped logical volume by providing access to the mapped volumes through all SPs of a storage system, reducing I/O latency by reducing contention introduced by redirection of I/Os from one SP to another SP, reducing the amount of time it takes to recover a mapped logical volume by performing recovery of portions of the mapped logical volume in parallel, and reducing lock contention by distributing I/O requests over multiple SPs.

Further, generally, management of storage paths to a mapped logical volume is provided by path management software. Path management software is a host-based software solution that is used to manage paths and, among other things, can detect load imbalances across paths and buses and can identify alternate paths through which to route data. An example of path management software is EMC POWERPATH by EMC Corporation of Hopkinton, Mass. Thus, path management systems hide storage path issues from a user in a storage area network (SAN) or other interconnection mechanism between hosts and arrays by performing a failover and load balancing operations. The failover operation indicates that when an I/O request using a storage path fails, the I/O request is sent using an alternate storage path. The load balancing operation increases bandwidth by sending I/O requests using multiple storage paths in parallel.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI, fibre channel connection or any server that supports a connection to data storage system 12 (e.g., SAS, FCoE).

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
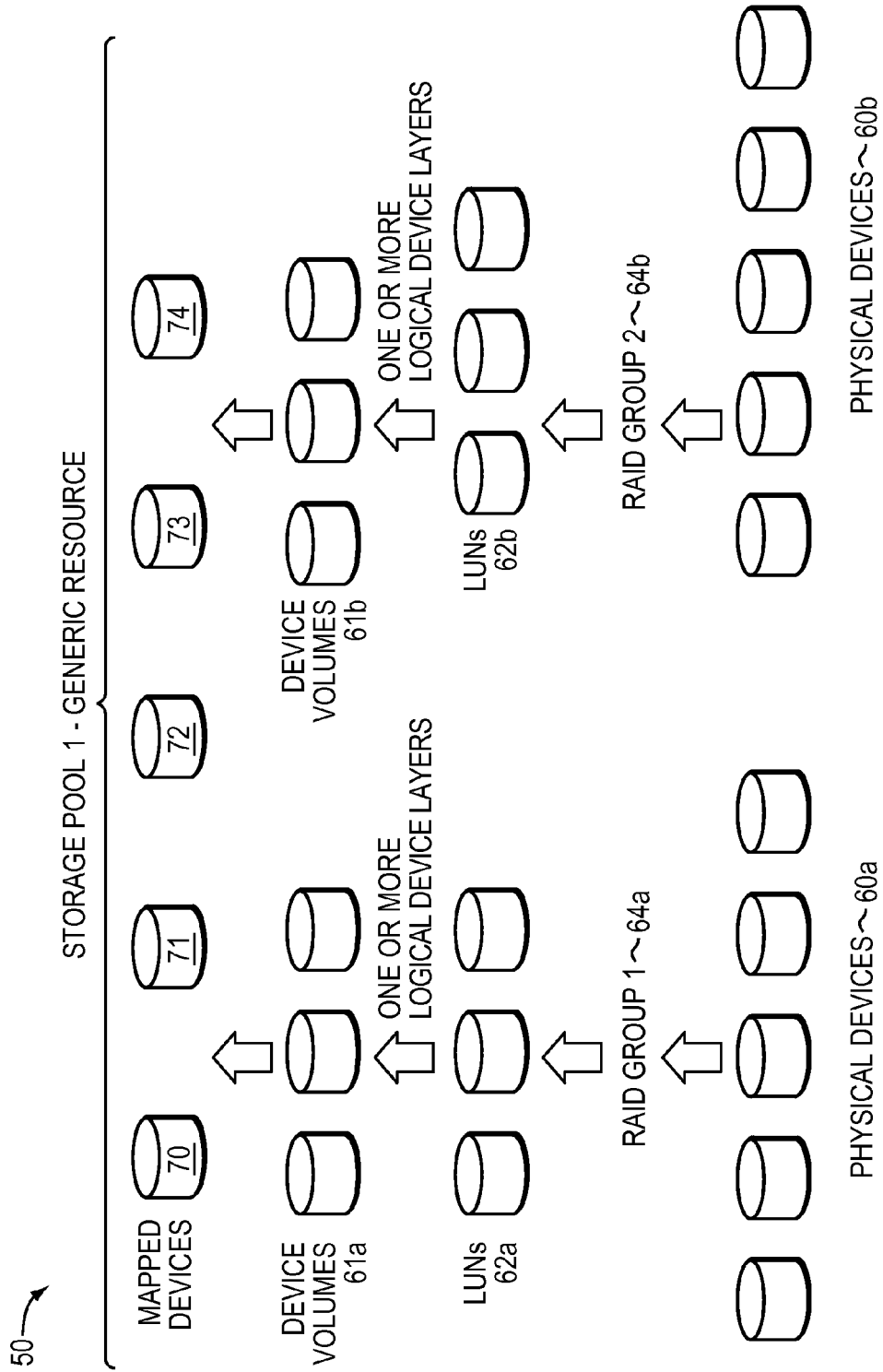
FIG. 2 is an example illustrating storage device layout.

Referring to FIG. 2, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 3:
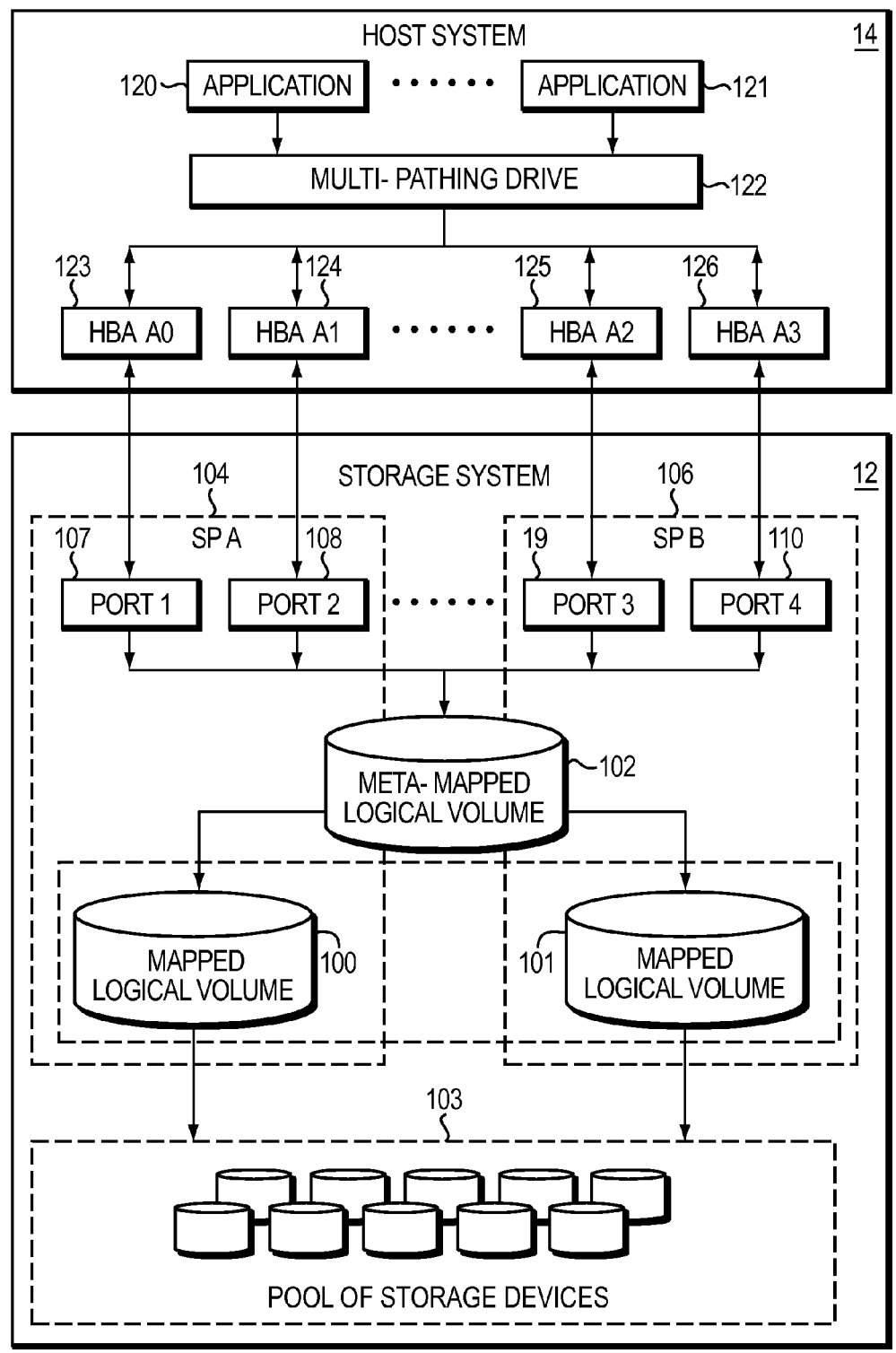
FIG. 3 is a block diagram illustrating in more detail components that may be used in connection with techniques herein.

Referring to FIG. 3, shown is a more detailed representation of components that may be included in an embodiment using the techniques described herein. Enterprise storage systems store data in large-scale environments and differ from consumer storage systems in both the size of the environment and the types of technologies that store and manage the data. Storage area networks (SANs) are commonly used in enterprise storage systems to transfer data between computer systems and storage devices. A typical SAN provides a communication infrastructure, including physical connections between computer systems, storage devices, and a management layer that organizes the connections between computer systems and storage devices.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber. A disk array controller in a storage array is a piece of hardware that provides storage services to computer systems that access the disk array.

Further, disk array controllers connect to a SAN via a port. A port serves as an interface between the disk array controller and other devices, such as hosts 14, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host bus adapter port) and a "target" (e.g., a storage controller port) via a path (also referred to as "storage path"). For example, a path may include a host bus adapter port, associated SCSI bus or Fibre Channel cabling, a disk array port, and a LUN. The types of path components in use vary with the storage I/O transport technology in use.

Generally, data storage array 12 includes a set of storage processor, for example, two SPs (SP-A 104 and SP-B 106), each of which typically has multiple storage bus ports (e.g. 107-110), which physically connect to storage network 18, although it should be understood that other numbers of SPs and storage bus ports are also possible.

Further, it should be understood that host 14 may have multiple paths for data storage operations to be sent to data storage array 12. A path is a pairing between a particular host bus adapter port of a host and a particular storage bus port. For example, host 14 includes host bus adapters HBA-A0 123 and HBA-A1 124 which are in communication with storage bus ports port-1 107 and port-2 108 and host bus adapters HBA-A2 125 and HBA-A3 126 which are communication with storage bus ports port-3 109 and port-4 110. These paths may be logical, or they may be physical, based on switched connections of a fabric of connections and switches. Having multiple paths between the host 14 and the data storage array 12 may be useful for load-balancing. The availability of multiple paths may also be useful in case one or more of the various ports goes off-line, or if a connection gets disconnected, in which case, storage operations can be re-routed over a different path.

Thus, FIG. 3 illustrates a multi-path storage environment according to an example embodiment of the current technique. Such multi-path storage environments typically are deployed with redundancies for enterprise purposes. For example, the multi-path storage environment of FIG. 3 illustrates redundant paths from host bus adapter (HBA) port A0 123, HBA port A1 124, HBA port A2 125, and HBA port A3 126 on host 14 over a Storage Area Network (SAN) 18 to mapped logical volume 102 through ports 1-4 107-110 of SP-A 104 and SP-B 106 respectively.

Further, a path management system includes multi-pathing driver 122 that provides path management and communicates with data storage systems 12 to manage I/O paths. A path refers to the physical route between a host and a logical unit (LU) of a storage system. A storage path refers to an end-to-end storage connection between a host and a mapped logical volume. Typically, multiple storage paths traverse a single bus. Thus, multi-pathing driver 122 supports multiple paths to a logical device (e.g., mapped logical volume thereby enabling multi-pathing driver 122 to provide automatic failover in the event of a failure such as a hardware failure. Further, multi-pathing driver 122 automatically detects a path failure and redirects an I/O request to another path. Further, multi-pathing driver 122 provides dynamic multi-path load balancing by distributing I/O requests to a logical device (e.g., TLU, mapped logical volume) across all available paths thereby improving I/O performance and reducing management time and downtime by eliminating the need to configure paths statically across logical devices.

Thus, multi-pathing driver 122 enables applications 120-121 to access the mapped logical volume 102 through multiple HBA ports 123-126 thereby enabling I/O requests directed to mapped logical volume 102 to traverse through multiple storage paths. Thus, multi-pathing driver 122 increases I/O throughput by sending I/O requests targeted to the same logical devices over multiple storage paths and prevents loss of data access by redirecting I/O requests from a failed storage path to an alternate storage path. Further, multi-pathing driver 122 may group all possible storage paths to the same logical device into a set of storage paths. Thus, multi-pathing driver 122 is responsible for selecting the optimal or near optimal path to a logical device to optimize performance and for protecting applications from path failures as multi-pathing driver 122 detects failed paths and retries failed application I/O requests on other functioning paths.

It should be noted that the terms storage path and path may be used interchangeably herein.

In at least one embodiment of the current technique, a mapped logical volume is created from two or more mapped logical volumes (e.g., internal or private TLU) such that at least one TLU is owned by one storage processor and at least one TLU is owned by another storage processor such that the two or more TLUs are logically combined based on an addressing scheme pattern. A mapped logical volume created from two or more TLUs owned by two or more storage processors respectively is then presented to a host system such that the host system is able to access the mapped logical volume in an active-active manner where the mapped logical volume is accessed using the two or more storage processors based on an offset (e.g., logical block address) within the mapped logical volume at which an I/O request is directed to. Thus, for example, an active-active mapped logical volume 102 is created from mapped logical volume (e.g., TLU) 100 owned by SP-A 104 and mapped logical volume (e.g., TLU) 101 owned by SP-B 106. In such a case, only the active-active mapped logical volume 102 is visible to a host system which is presented to the host system as a traditional mapped logical volume. The TLUs 100 101 may be created from slices from storage pool 103. In at least one embodiment of the current technique, TLUs 101 and 101 may logically be combined to create mapped logical volume 102 in such a way that the first half of the mapped logical volume 102 is represented by TLU 100 owned by SP-A 104 and the second half of the mapped logical volume 102 is represented by TLU 101 owned by SP-B 106. In at least one embodiment of the current technique, TLUs 101 and 101 may logically be combined to create mapped logical volume 102 in such a way that portions of TLUs 100 and 101 are interleaved with each other such that a section at a logical address starting at an even offset within mapped logical volume 102 is represented by a fixed-sized portion of TLU 100 and a section at a logical address starting at an odd offset within mapped logical volume 102 is represented by a fixed-sized portion of TLU 10. It should be noted that two or more TLUs may be combined in any other known pattern to create a mapped logical volume which can be accessed by a host in the active-active manner.

Thus, in at least one embodiment of the current technique, by creating a mapped logical volume from thin LUs (TLU) owned by each one of the storage processor of a storage system enables a host system to send I/O requests to each one of the storage processors as each one of the storage processors now owns a portion of the mapped logical volume. It should be noted that TLUs from which an active-active mapped logical volume (e.g., active-active TLU) is created are not visible or accessible to a user and/or host and are referred to as internal or private TLUs.

Further, in at least one embodiment of the current technique, multi-pathing driver 122 includes a mechanism such as using SCSI vendor specific mode pages to query a logical device such as mapped logical volume 102 to determine information regarding a pattern used to create the mapped logical volume 102 such that multi-pathing driver 122 can send an I/O request to a set of optimal or near optimal storage processors based on an offset of the mapped logical volume 102 associated with the I/O request such that the portion of the mapped logical volume 02 associated with the offset is owned by the storage processor selected by multi-pathing driver 102 for sending the I/O request. Thus, overall storage system performance and I/O performance of a mapped logical volume is improved by reducing or eliminating SP redirection. Generally, a mapped logical volume is organized using a file system which maps a set of fixed-sized blocks (e.g. 8 Kilo- Bytes (KB)) to the mapped logical volume. Further, generally, the file system used for organizing a mapped logical volume is not a distributed file system and thus must be owned by one of the storage processors of a storage system. In such a system, in order to avoid I/O redirection and provide to a host an active-active mapped logical volume that is storage path-agnostic, the mechanism using the current technique as described above herein can be used by multi-pathing driver 122 to efficiently and intelligently send I/O requests to a mapped logical volume in an active-active manner.

Further, a change in a pattern in which an active-active mapped logical volume is created from two or more mapped logical volumes may trigger the multi-pathing driver 122 to inquire data storage system 12 again regarding information associated with the change in the pattern. One such mechanism that may cause the change in a pattern is migration of a mapped logical volume from one logical unit type to another logical unit type which may occur in the same or different storage pools (e.g., changing a TLU to an active-active traditional LUN). Another such mechanism that may cause the change in a pattern is using a different data service such as compression. It should be noted that other mechanisms may cause the change in a pattern for a mapped logical volume as well.

Further, it should be noted that mapped logical volume 102 may be accessed by a host system that does not include multi-pathing driver 122. Thus, it should be noted that mapped logical volume 122 may be accessed by any host system in an active-active manner such that an I/O request may be sent to any one of the storage processors of a storage system with which the host system is in communication with.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing active-active mapped logical volumes, the method comprising:
   creating a mapped logical volume, wherein the mapped logical volume includes first and second mapped logical volumes, wherein ownership of the first mapped logical volume resides with a first storage processor of a storage system and ownership of the second mapped logical volume resides with a second storage processor of the storage system, wherein the mapped logical volume is created from the first and second mapped logical volumes based on a pattern; and
   managing the mapped logical volume, wherein an access to the mapped logical volume is provided to the first and second storage processors.

2. The method of claim 1, wherein the pattern includes an even-odd address pattern indicating that portions of the first and second mapped logical volumes are interleaved at even and odd logical block address with each other for creating the mapped logical volume.

3. The method of claim 1, wherein an I/O request directed to a portion of the mapped logical volume represented by storage space associated with the first mapped logical volume is sent to the first storage processor.

4. The method of claim 1, wherein an I/O request directed to a portion of the mapped logical volume represented by storage space associated with the second mapped logical volume is sent to the second storage processor.

5. The method of claim 1, wherein the mapped logical volume is presented to a user for managing access to the mapped logical volume in an active-active manner.

6. The method of claim 1, wherein the mapped logical volume includes a set of slices, each slice of the set of slices is a logical representation of a subset of physical disk storage.

7. The method of claim 1, wherein storage for the mapped logical volume is allocated from storage space including a disk drive system comprising a plurality of Redundant Array of Inexpensive Disks (RAID) systems, each RAID system of the plurality of RAID systems having a first disk drive and a second disk drive.

8. The method of claim 1, wherein the mapped logical volume is accessed in an active-active manner indicating that the mapped logical volume is accessed by each storage processor of a set of storage processors included in the storage system.

9. The method of claim 1, wherein the mapped logical volume is a thin logical volume, wherein the thin logical volume includes a file system.

10. A system for use in managing active-active mapped logical volumes, the system comprising a processor configured to:
    create a mapped logical volume, wherein the mapped logical volume includes first and second mapped logical volumes, wherein ownership of the first mapped logical volume resides with a first storage processor of a storage system and ownership of the second mapped logical volume resides with a second storage processor of the storage system, wherein the mapped logical volume is created from the first and second mapped logical volumes based on a pattern; and
    manage the mapped logical volume, wherein an access to the mapped logical volume is provided to the first and second storage processors.

11. The system of claim 10, wherein the pattern includes an even-odd address pattern indicating that portions of the first and second mapped logical volumes are interleaved at even and odd logical block address with each other for creating the mapped logical volume.

12. The system of claim 10, wherein an I/O request directed to a portion of the mapped logical volume represented by storage space associated with the first mapped logical volume is sent to the first storage processor.

13. The system of claim 10, wherein an I/O request directed to a portion of the mapped logical volume represented by storage space associated with the second mapped logical volume is sent to the second storage processor.

14. The system of claim 10, wherein the mapped logical volume is presented to a user for managing access to the mapped logical volume in an active-active manner.

15. The system of claim 10, wherein the mapped logical volume includes a set of slices, each slice of the set of slices is a logical representation of a subset of physical disk storage.

16. The system of claim 10, wherein storage for the mapped logical volume is allocated from storage space including a disk drive system comprising a plurality of Redundant Array of Inexpensive Disks (RAID) systems, each RAID system of the plurality of RAID systems having a first disk drive and a second disk drive.

17. The system of claim 10, wherein the mapped logical volume is accessed in an active-active manner indicating that the mapped logical volume is accessed by each storage processor of a set of storage processors included in the storage system.

18. The system of claim 10, wherein the mapped logical volume is a thin logical volume, wherein the thin logical volume includes a file system.

\* \* \* \* \*